(12) United States Patent
Lee

(10) Patent No.: US 11,492,754 B2
(45) Date of Patent: Nov. 8, 2022

(54) NON-WOVEN BACKING FOR PRESS FELT, METHOD FOR PRODUCING NON-WOVEN BACKING, AND PRESS FELT

(71) Applicant: AstenJohnson, Inc., Charleston, SC (US)

(72) Inventor: Henry Lee, Simpsonville, SC (US)

(73) Assignee: AstenJohnson, Inc., Charleston, SC (US)

( * ) Notice: Subject to any disclaimer, the term of this patent is extended or adjusted under 35 U.S.C. 154(b) by 169 days.

(21) Appl. No.: 16/966,189

(22) PCT Filed: Nov. 20, 2018

(86) PCT No.: PCT/US2018/061925
§ 371 (c)(1),
(2) Date: Jul. 30, 2020

(87) PCT Pub. No.: WO2019/152088
PCT Pub. Date: Aug. 8, 2019

(65) Prior Publication Data
US 2021/0040691 A1 Feb. 11, 2021

Related U.S. Application Data

(60) Provisional application No. 62/625,489, filed on Feb. 2, 2018.

(51) Int. Cl.
*D21F 7/08* (2006.01)
*D21F 7/10* (2006.01)
(Continued)

(52) U.S. Cl.
CPC ............... *D21F 7/083* (2013.01); *D21F 7/10* (2013.01); *B32B 5/022* (2013.01); *B32B 5/26* (2013.01);
(Continued)

(58) Field of Classification Search
CPC ... D21F 7/02; D21F 7/083; D21F 7/10; D21F 7/12
(Continued)

(56) References Cited

U.S. PATENT DOCUMENTS 8,372,246 B2 2/2013 Hawes et al.
2001/0027593 A1 10/2001 Paquin et al.
(Continued)

FOREIGN PATENT DOCUMENTS

CN 1629398 6/2005
CN 105121719 12/2015

*Primary Examiner* — Eric Hug
(74) *Attorney, Agent, or Firm* — Volpe Koenig

(57) ABSTRACT

A press felt is provided including a non-woven base fabric material formed of a first fabric structure, with the first fabric structure including an array of MD yarns connected with at least one layer of a hot melt adhesive web material and at least one layer of a non-woven backing. The non-woven backing includes a layer of a first yarn system and a layer of a second yarn system oriented transverse to the first yarn system. At least one of the first and second yarn systems includes a low melt temperature adhesive that is heat activated and binds the first and second yarn systems together. The nonwoven base fabric material has an MD length and CD width and is arranged in two superimposed layers joined by the MD oriented yarns at CD oriented fold regions at each of two opposing ends thereof.

15 Claims, 10 Drawing Sheets

(51) Int. Cl.
  *B32B 5/02* (2006.01)
  *B32B 5/26* (2006.01)
  *B32B 7/12* (2006.01)

(52) U.S. Cl.
  CPC ......... *B32B 7/12* (2013.01); *B32B 2262/0261* (2013.01); *B32B 2262/0292* (2013.01)

(58) Field of Classification Search
  USPC .......................... 162/900, 904, 358.1, 358.2
  See application file for complete search history.

(56) References Cited

U.S. PATENT DOCUMENTS

| | | |
|---|---|---|
| 2005/0136757 A1 | 6/2005 | Despault et al. |
| 2007/0163667 A1 | 7/2007 | Crook |
| 2007/0254546 A1* | 11/2007 | Despault .................. D04H 3/05 156/60 |
| 2009/0293245 A1 | 12/2009 | Kockritz |
| 2016/0069022 A1* | 3/2016 | Lee ......................... D21F 7/083 162/202 |
| 2017/0233946 A1 | 8/2017 | Sealey et al. |

* cited by examiner

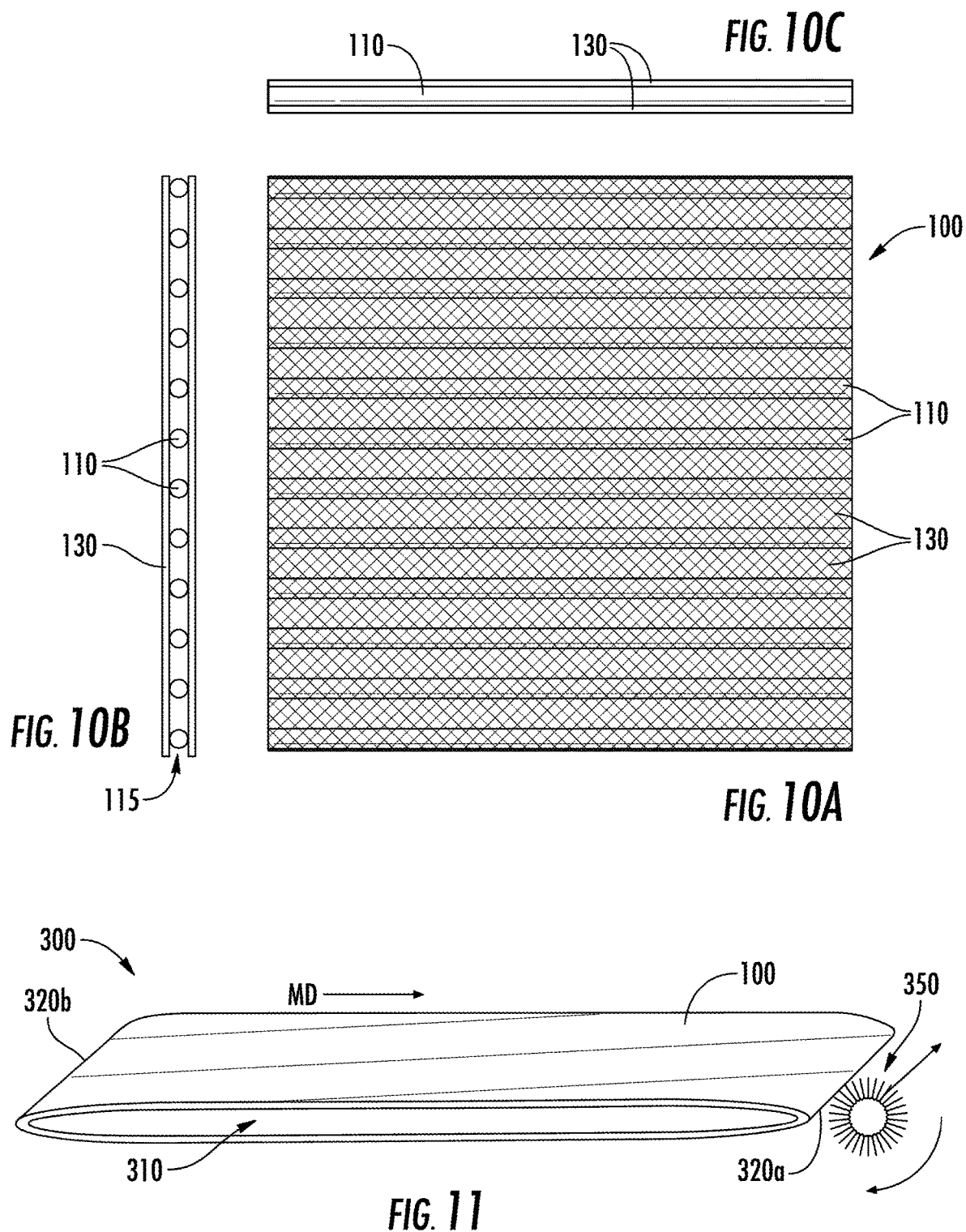

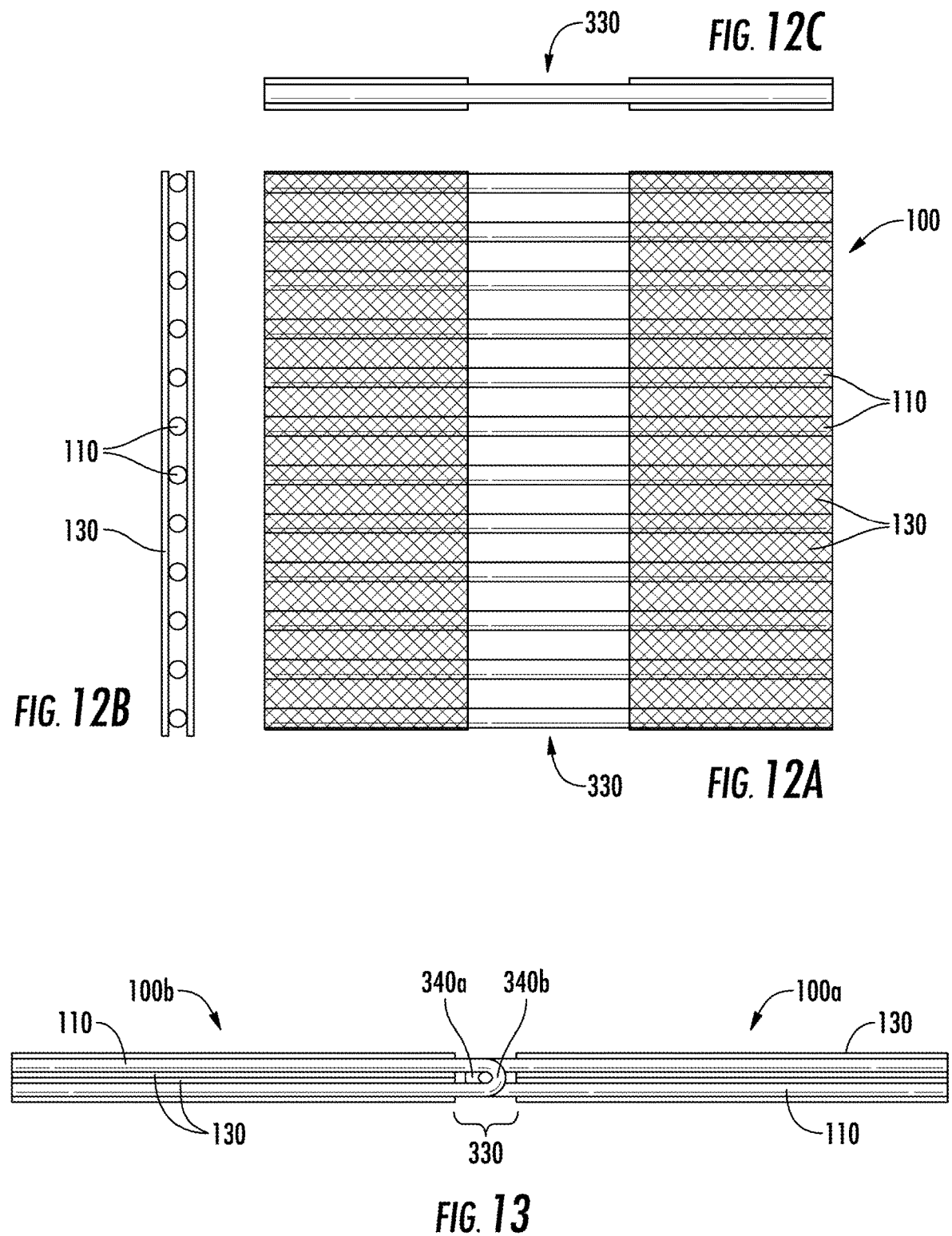

NON-WOVEN BACKING FOR PRESS FELT, METHOD FOR PRODUCING NON-WOVEN BACKING, AND PRESS FELT

INCORPORATION BY REFERENCE

The following documents are incorporated herein by reference as if fully set forth: U.S. Provisional Patent Application No. 62/625,489, filed Feb. 2, 2018.

FIELD OF THE INVENTION

The invention generally concerns papermaking fabrics, and more particularly to press felts for use in the manufacture of paper and similar products in a papermaking or like machine. It is particularly concerned with a non-woven backing layer used in the manufacture of multi-layer press felts which include a nonwoven yarn array bonded to an elastic carrier. Specifically, the invention relates to an improved press felt made using a novel non-woven backing layer to produce a finer base surface on the paper support side of the non-woven yarn array and that reduces the possibility of yarns (typically monofilaments) of the array from migrating through the batt to stop "stringing" of monofilaments.

BACKGROUND OF THE INVENTION

The present invention concerns press felts for use in the press section of papermaking machines. In the manufacture of paper products, a stock slurry consisting of about 1% papermaking fibers and others solids dispersed in about 99% water is delivered at high speed and precision from a headbox slice onto a rapidly moving forming fabric, or between two forming fabrics, in the forming section of a papermaking machine. The stock is subjected to agitation and is dewatered by various means through the forming fabrics, leaving behind a loosely cohesive and wet web of fibers. This web is then transferred to the press section where a further portion of water is removed by mechanical means as the web, supported by one or more press felts, passes through at least one, and usually a series, of press nips where water is essentially squeezed from the nascent sheet and into the press felt. The water is accepted by the press felt and, ideally, does not return to the web. The resulting sheet is then passed to the dryer section which includes a series of rotatable dryer drums, or cans, that are heated by steam. The sheet is directed around and held in contact with the periphery of these drums by one or more dryer fabrics so that the majority of the remaining water is removed by evaporation.

Press felts play a critical role in the manufacture of paper products. The known press felts are produced in a wide variety of styles designed to meet the requirements of the papermaking machines on which they are installed, and the paper grades being manufactured. They are generally assembled using a woven or nonwoven base fabric structure into which is needled one and usually multiple layers of a fibrous nonwoven batt. The batt provides a smooth surface upon which the paper product is conveyed, acts as a reservoir to trap water expressed at the press nip, and provides a measure of resiliency to the press felt as it passes through the nip. The base fabrics are typically woven from monofilament, cabled monofilament, multifilament or similar multi-component yarns (referred to generally as "yarns"); they may also be arranged as nonwoven planar arrays. The component yarns are usually comprised of an extruded polymeric resin, typically a polyamide.

The base fabrics may be of single layer or multilayer construction, or they may be formed from two or more layers which are laminated together.

More recently, multiaxial press felts such as described in U.S. Pat. Nos. 5,360,656; 5,268,076; 5,785,818 and others have gained wider acceptance in the industry. The base fabrics of these press felts are comprised of a plurality of spirally wound and edgewise joined turns of a material strip including at least machine direction (MD) oriented yarns. The material strip is usually a flat woven fabric which is narrower than the width of the intended base fabric of which it is a component; it has also been proposed to use nonwoven arrays of MD yarns as the material strip component. Regardless of whether the component is woven or nonwoven, during assembly each turn of the material strip is directed about two opposing rollers such that its component MD yarns are canted at a small angle that is from about 1° to about 8° to the intended MD of the finished fabric; see prior art FIG. 1. Each successive turn of the material strip is edgewise bonded to that laid adjacent to it so as to build up a continuous tube-like base fabric of desired width and length. When removed from the assembly rollers and laid flat, the tube has continuous top and bottom surfaces joined at cross-machine direction (CD) oriented fold regions at each of the two opposing ends; see prior art FIG. 2. The completed multiaxial base fabrics are typically one of a two, three or four layer construction comprising the top and bottom surfaces of the spirally wound continuous tube, and optionally at least one additional flat fabric layer, located either interior to the flattened tube, or on top of one or both exterior surfaces. The assembled base fabrics may later be provided with a seam to facilitate their installation on the machine for which they are intended.

U.S. Pat. No. 9,315,940, which is directed to a prior invention of the present inventor and is assigned to the same assignee, is directed to a multiaxial press felt that addresses many of the issues of the known prior art press felts. This multiaxial press felt uses a first fabric structure formed from a generally planar yarn assembly including an array of mutually parallel and regularly spaced polymeric yarns that are bonded to a carrier material. This first fabric structure is spirally wound to define a base fabric, and the tube collapsed to form CD folds that define seaming loops from the yarns of the array, which are generally oriented in the MD. A filler layer formed a second fabric structure made from similar yarn arrays that are bonded to and held together by a carrier material is inserted in the collapsed tube, with the yarns of the filler layer extending generally in the CD. The carrier material in each case is a non-woven scrim, which can be elastic for the filler layer. The filler layer can also include high surface contact area material at the exterior MD edges to form ends of the filler yarn assembly that are located adjacent to the loops formed of the MD oriented yarns at the fold regions to form MD ends of the generally planar yarn assembly that extend in the CD width direction. Each of the MD ends is oriented parallel to the loops of the MD oriented yarns and is anchored in a fixed position adjacent to the loops at each of the fold regions. This allowed for better fixation of the batt material at the seam region in order to reduce marking, as well as other advantages over the other known multiaxial press fabrics. A detailed explanation is provided in U.S. Pat. No. 9,315,940 which is incorporated herein by reference as fully set forth.

One issue with the press felt of U.S. Pat. No. 9,315,940 is that the non-woven carrier material was basically designed as a processing aid that was responsible for holding the yarn arrays intact until they are mechanically attached by fibers in the needling process. The needling process generally destroys the non-woven backing layer so that it provides no value in the customer's application for the resulting press felt.

It would be desirable to provide a press felt base fabric construction which addresses the known problems of sheet marking, batt shedding, fabric compaction and void volume loss in the known press felt constructions, and particularly multiaxial press felt construction. The base fabric constructions of the present invention address some or all of these issues.

SUMMARY

A seamed press felt is provided comprising a non-woven base fabric material formed of a first fabric structure, with the first fabric structure including an array of MD yarns located between two layers of a hot melt adhesive web material and two layers of non-woven backing. The non-woven backing includes a layer of a first yarn system and a layer of a second yarn system oriented transverse to the first yarn system. At least one of the first and second yarn systems includes a low melt temperature adhesive that is heat activated and binds the first and second yarn systems together. The non-woven base fabric material has an MD length and CD width and is arranged in two superimposed layers joined by the MD oriented yarns at CD oriented fold regions at each of two opposing ends thereof. The MD oriented yarns form uniform loops at the fold regions to define a channel extending the CD width of the press felt. A generally planar yarn assembly formed of a second fabric structure is provided and includes an array of parallel yarns. The generally planar yarn assembly is located interior to the two superimposed layers of base fabric and is oriented such that the parallel yarns of the array are oriented in the CD of the press felt. A pintle extends through the channel defined by intermeshing the loops from the two opposing ends to form a seam.

A seamless papermaking fabric, in particular a press felt, is also provided comprising a non-woven base fabric material formed of a first fabric structure, with the first fabric structure including an array of MD yarns and at least one layer of a hot melt adhesive web material and at least one layer of non-woven backing. The non-woven backing includes a layer of a first yarn system and a layer of a second yarn system oriented transverse to the first yarn system. At least one of the first and second yarn systems includes a low melt temperature adhesive that is heat activated and binds the first and second yarn systems together. The first fabric structure has an MD length and CD width and is arranged formed as a first endless fabric loop. A generally planar yarn assembly formed of a second fabric structure is provided and includes an array of CD oriented parallel yarns and is formed into a second endless fabric loop that is generally the same size as the endless loop of the first fabric structure. The second endless fabric loop is inserted into the first endless fabric loop forming two superimposed layers of the first and second fabric structures. Optionally a third fabric structure formed as a third endless fabric loop, constructed in the same manner as the first endless fabric loop, is inserted into the second endless fabric loop. The first, second, and optionally third endless fabric loops are then connected together through needling at least one layer of batt material into and through the superimposed layers of these fabric structures.

In a preferred arrangement, in the second fabric structure, the array of parallel yarns are bonded between two second layers of a hot melt adhesive web material and two second layers of a second non-woven backing. The second non-woven backing includes a layer of a first yarn system and a layer of a second yarn system oriented transverse to the first yarn system. At least one of the second non-woven backing first and second yarn systems includes a low melt temperature adhesive that is heat activated and binds the second non-woven backing first and second yarn systems together.

In one preferred arrangement, the first yarn system includes multi-filament yarns twisted into a round diameter of 0.1 to 0.5 mm, and the second yarn system includes multi-filaments having a diameter of 0.2 mm or less.

Preferably, the multifilament yarns are comprised of a polymer selected from a polyamide or a polyurethane. These yarns of the first yarn system are oriented in the CD and have a tensile strength of at least about 50lb cloth/inch.

In one preferred arrangement, the multifilament yarns of the first yarn system have a fill density of 80% or greater. However, this can be varied depending on the properties ultimately required for the finished press felt.

Preferably the multi-filaments of the second yarn system have a fill density of 20% or less. This can also be varied depending on the properties ultimately required for the finished press felt.

According to the invention the non-woven backing layer provides an additional advantage in that a void volume of the press felt is adjustable by at least one of: adjusting at least one of a fill density or a size of the parallel yarns in the array of MD or CD yarns of the generally planar yarn assembly, adjusting at least one of a fill density or a size of yarns in the first yarn system, or adjusting at least one of a fill density or a size of yarns in the second yarn system. Thus rather than acting merely as a construction aid, the present non-woven backing contributes to the final press felt properties and can be used to improve dewatering performance, increase fabric run time by reducing "stringing", as well as improve batt anchorage.

In a preferred embodiment, the base fabric material with the array of MD yarns comprises a plurality of spirally wound turns of the first fabric structure and each adjacent one of the wound turns of the first fabric structure is oriented at an angle to the MD and is bonded to an adjacent turn to provide a flattened continuous double layer tube in the case of the seamed press felt. The second fabric structure is then inserted into this tube. For the seamless press felt, the plurality of spirally wound turns of the first fabric structure and each adjacent one of the wound turns of the first fabric structure is again oriented at an angle to the MD and is bonded to an adjacent turn to provide the endless tube that generally corresponds to the size of the finished press felt.

In the completed base fabric, the MD yarns are preferably single circular cross-sectional shaped monofilaments having a diameter of 0.2 mm to 0.6 mm arranged at a yarn density of from 15 to 40 yarns/inch (5.9 to 15.7 yarns/cm). The CD yarns of the second fabric structure are preferably single circular cross-sectional shaped monofilaments having a diameter of 0.2 to 0.5 mm arranged at a yarn density of from 15 to 40 yarns/inch.

In another aspect, a non-woven backing layer for use in a press felt is provided, comprising a layer of a first yarn system and a layer of a second yarn system oriented transverse to the first yarn system. At least one of the first and second yarn systems includes a low melt temperature adhesive that is heat activated and binds the first and second yarn systems together. The first yarn system includes multi-filament yarns having a round diameter of 0.1 to 0.5 mm, and the second yarn system includes multi-filaments having a diameter of 0.2 mm or less.

Preferably, the multifilament yarns have a fill density of 80% or greater, and the monofilaments of the second yarn system have a fill density of 20% or less.

The second fabric structure that includes the array of CD oriented parallel yarns can be formed in panels, for example having a width in the MD of 1 meter, and these panels are then joined edge to edge through an overlapped weld zone, where the panels can be laser welded or heat fused together to achieve the desired MD length. The MD edges of the first and last panels are then joined in the same manner to form the second endless fabric loop that is generally the same size as the endless loop of the first fabric structure for the seamless press felt.

One preferred low melt temperature adhesive comprises Copolyamide Nylon.

BRIEF DESCRIPTION OF THE DRAWINGS

The foregoing Summary and the following detailed description and claims will be best understood when read in conjunction with the drawings which show the presently preferred embodiments of the invention. In the drawings:

FIG. 10A is a planar view of the first fabric structure provided in FIG. 4 showing the first (MD) yarn array oriented horizontally across the page including a layer of second scrim material laid over the first yarn array;

FIG. 10B is a cross-section through the MD yarns of this structure located at the left; and FIG. 10C is a cross-section along an MD yarn provided at the top of FIG. 10A;

FIG. 11 provides a schematic illustration of a double layer base fabric structure formed from the first fabric structure presented in FIGS. 4, 5 & 10A-10C following a spiral winding process and prior to assembly with a generally planar yarn assembly; a translating device to remove scrim material from between the yarns of the first fabric structure at the seam region following spiral winding is shown at right;

FIGS. 12A-C show the first fabric structure of FIGS. 10A-10C in which a portion of the first scrim material has been removed at one of the fold areas using the translating device in FIG. 11 to expose the MD oriented yarns of the first yarn array;

FIG. 13 shows a cross-section of the seam regions at the two folded ends of the base fabric of FIG. 12A-C where they have been intermeshed together at the exposed and folded MD yarns of the first fabric structure which now form a series of loops across the fabric structure;

DETAILED DESCRIPTION OF THE PREFERRED EMBODIMENTS

Figure 1:
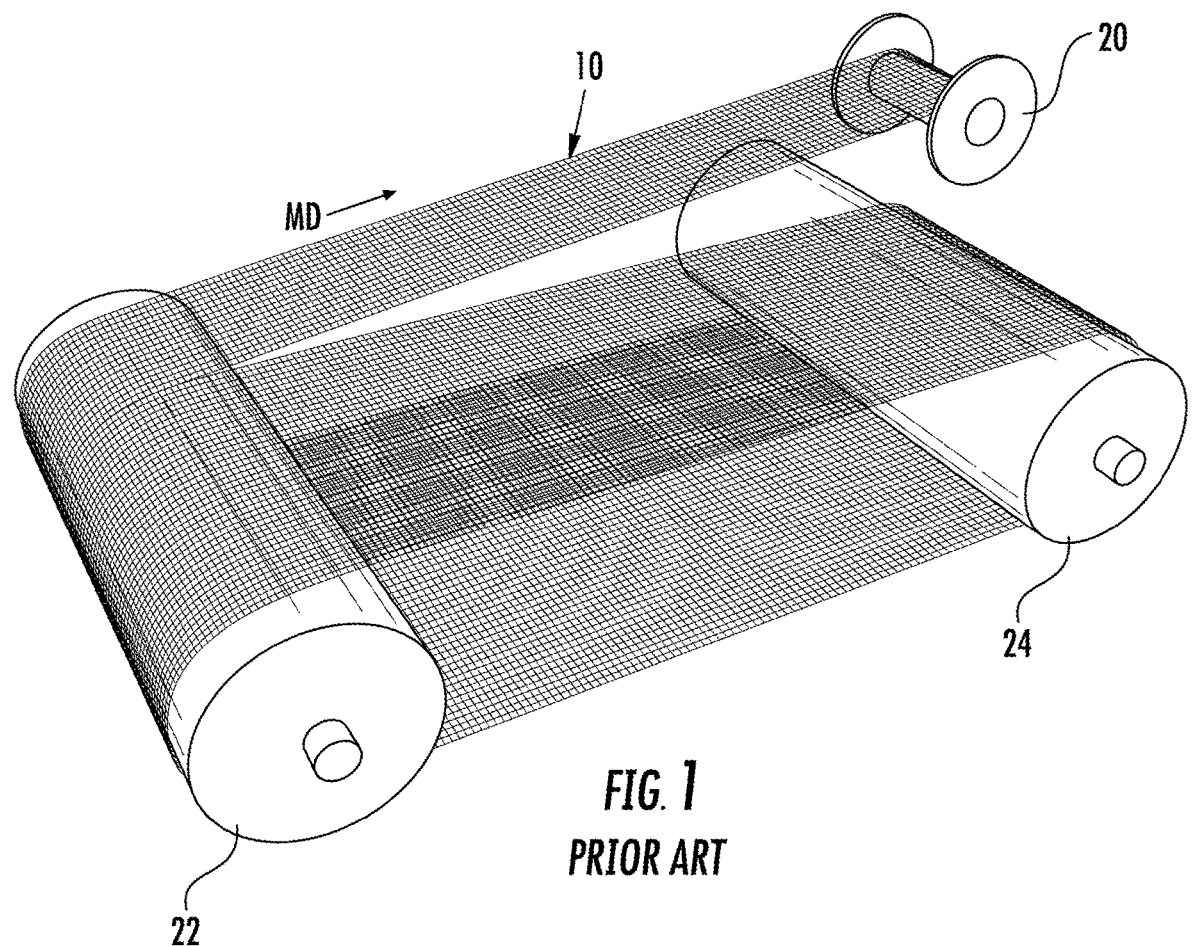
FIG. 1 is an illustration showing a known spiral winding process in which a strip of relatively narrow fabric 10 is spirally wound from a feed source 20 between two opposed rolls 22, 24 to produce a desired width and length of base fabric. Each successive turn of strip 10 is bonded to that to which it is laid adjacent in the process to provide the base fabric.

Certain terminology is used in the following description for convenience only and is not limiting. The words "top," "bottom," "upper" and "lower" designate directions in the drawings to which reference is made. The words "interior" and "exterior" refer to directions within or outside of the two layers of the base fabric. A reference to a list of items that are cited as "at least one of a, b, or c" (where a, b, and c represent the items being listed) means any single one of the items a, b, or c, or combinations thereof. "A" or "an" refer to one or more of the item noted. "MD" refers to a machine direction in the papermaking machine from the headbox to the dryer section and is the longitudinal direction of the press felt. "CD" refers to the cross-machine direction, or a direction perpendicular to the machine direction in the plane of the fabric. The term "PS" refers to the paper side surface of the fabric, which is the surface upon which the paper product is carried through the papermaking machine. "MS" refers to the machine side of the fabric and is the surface opposite to the PS. Unless otherwise specified, the term "yarn" or "yarns" refers to a continuous length of either single or cabled polymeric monofilaments or multicomponent fiber or fibers such as would be used in the manufacture of the base fabrics of the invention. The term "fiber" or "fibers" refers to relatively small diameter polymeric materials, and in addition to being part of multicomponent yarns, can be used in batt materials; these fibers have a very small dtex (mass in grams per 10,000 meters of fiber). "Seam region" refers to the exposed yarn loops of the MD yarns at the CD fold areas at the opposing MD ends of the seamed press felt. The term "array" refers to a generally planar group of mutually parallel yarns which are not interwoven or interconnected with one another by interlacing. "Orthogonal" or "perpendicular" as used herein with respect to the CD and MD yarns means generally within about 85° to 95° based on the deviation from true perpendicular created by the spiral winding of the MD yarns in the first yarn array. The terms "left", "right", "up", "down" are used in relation to the drawings and have the meanings usually assigned. Additional definitions for terms used herein are as follows:

Additional Definitions

"Press felt base fabric": a woven or nonwoven assembly of yarns provided as an endless structure or continuous loop including two superimposed layers joined (when laid flat) at two opposing fold areas including continuous MD yarns passing around the folds. The assemblies can take the form of: a) an endless woven structure, b) a modified endless woven structure, c) a flat woven fabric folded at two locations to provide a double layer assembly, d) a fabric formed according to a multiaxial assembly process, or e) a nonwoven structure assembled to provide any of the previous assemblies. The present invention is applicable to all of the above, but it is particularly suitable for use in both woven and nonwoven multiaxial base fabric constructions that can be seamless or seamed. Seamed base fabrics are post processed to provide seam loops formed by the MD oriented component yarns allowing the fabric to be joined and thus rendered endless. These base fabrics provide the finished press felt with the physical properties (strength, void volume, resiliency) necessary for it to survive the rigors of the machine environment in which it will be used, while providing a rugged carrier for the batt fibers.

Preferred Embodiments

Figure 18:
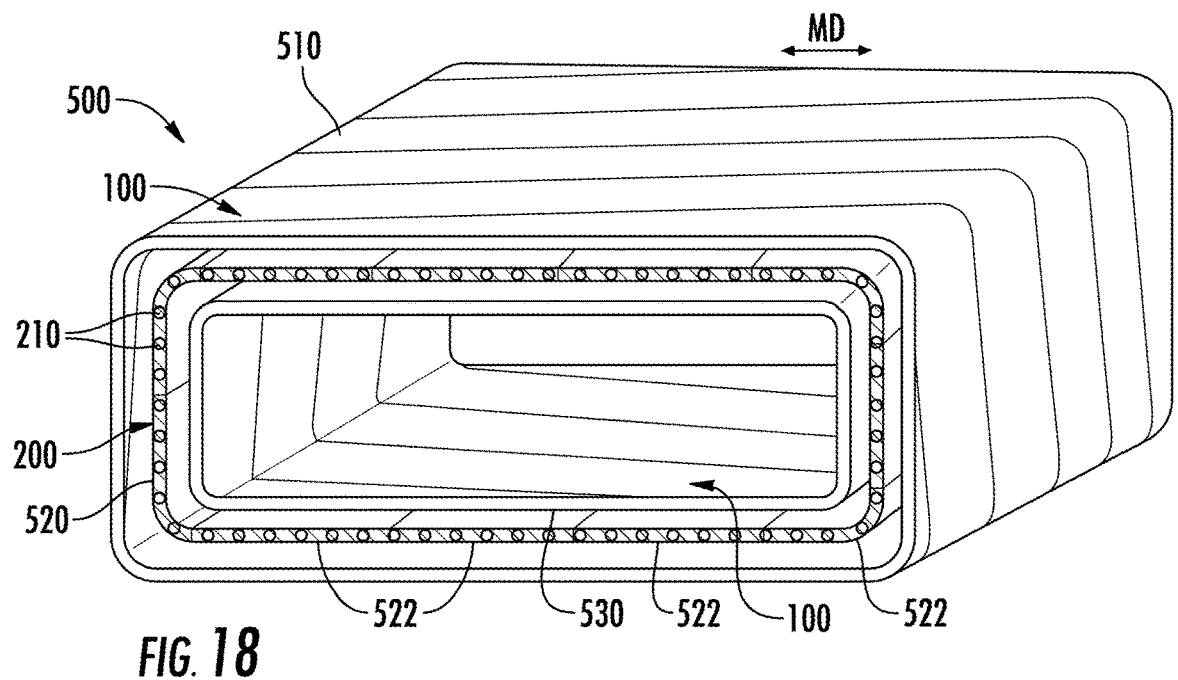
FIG. 18 is a perspective view of an assembled seamless press felt according to a second embodiment that is constructed from a first fabric structure formed as a first endless fabric loop, a second fabric structure formed as a second endless fabric loop, and a third fabric structure formed as a third endless fabric loop.
Figure 19:
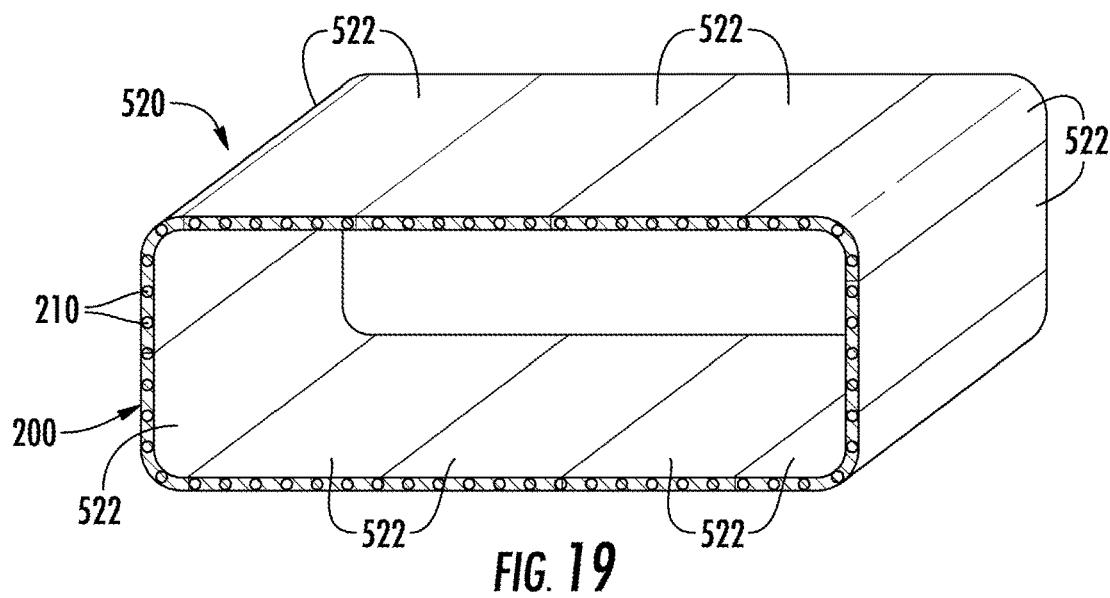
FIG. 19 is a perspective view of the second fabric structure formed as a second endless fabric loop from assembled CD yarn array panels that are joined together at their MD edges.
Figure 20:
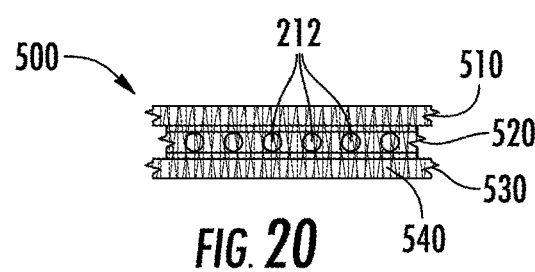
FIG. 20 is a cross-sectional view through a press felt according to FIG. 18 including at least one needled batt layer to join the first, second and third fabric structures together.

Referring to FIGS. 3-16, several embodiments of seamed multiaxial press felts according to the invention are shown. The embodiments may include a woven or nonwoven base fabric to which at least one layer of a fibrous batt material is needled, and a method of making same. FIGS. 18-20 show an endless embodiment of a multiaxial press felt that can include a woven or non-woven base fabric and at least one layer of a fibrous batt material needled to the base fabric construction.

In a first embodiment, the base fabric is comprised of at least two yarn arrays, each oriented perpendicularly to the other and arranged in a stacked or stratified manner. The first array is comprised of first yarns preferably having a first diameter or size and first yarn density (i.e. number of yarns per unit length). The first array is assembled into a first fabric structure by being connected to at least one and preferably being "sandwiched" between two sheets of an adhesive web, which has a first melting temperature. The first array and adhesive web is connected to at least one and preferably sandwiched between two layers of a non-woven backing, described in more detail below. The first array, together with the adhesive webs and non-woven backing layers, are subjected to heat and pressure in a hot lamination process, the heat sufficient to melt the adhesive webs and bond the yarns of the first array to the non-woven backing layer to provide a generally planar and cohesive first fabric structure. The non-woven backing layer imparts cohesive strength to the first array and its component fibers act to enhance the dewatering performance of the completed press felt. Further, the component fibers can be adjusted for specific applications to achieve specific properties with respect to void volume, air permeability, and batt anchoring.

A continuous length of this first fabric structure having a selected width [of about 1 m] is produced and is spirally wound in a longitudinal direction at a small angle, which is generally about 5° or less to the MD, according to known techniques so as to build up a continuous tube that is open in the center. Adjacent edges of successive turns of the first fabric structure are bonded to one another by one of welding, stitching or other known bonding means as they are spirally wound. This is schematically shown in FIG. 11. For the seamed press felt, the tube is then collapsed, or flattened, to bring the opposing surfaces of the tube together to form a double layer arrangement having an MD length and CD width and an the open central area inside the tube. Fold regions are prepared at the opposed lateral CD edges. Unbroken lengths of the first yarns at each of the fold areas are freed to provide loops which will be used at a later stage to form a seam region to allow the eventually assembled and finished fabric to be joined on the machine for which it is intended.

A second fabric structure, preferably in the form of a generally planar yarn assembly, is prepared including an array comprising second yarns, which may be either monofilaments or multicomponent yarns such as multifilaments or cabled monofilaments preferably having a second diameter or size equal to or less than that of the first yarns, and arranged at a selected second yarn density which is preferably equal to or greater than the first yarn density. However, it could be less than the first yarn density depending on the particular application and requirements. The second array is connected to at least one and preferably sandwiched between two sheets of the adhesive web having a first melting temperature. The second array and the sheets of adhesive web are then together connected to at least one and preferably sandwiched between two layers of a second non-woven backing. This can be the same as the non-woven backing used in the first fabric structure, or can be constructed in a similar manner but with different component yarn sizes, density, and/or materials, depending on the particular properties that are desired for a particular application. The second array, together with the adhesive webs and second non-woven backing, are then subjected to pressure and heat sufficient to melt the adhesive web and bond the yarns of the second array to the fibrous scrim to provide a cohesive generally planar yarn assembly, which forms the second fabric structure. Multiple strips of selected length of the second fabric structure can be assembled edge to edge by joining adjacent strips to one another to build up a desired width; various bonding means such as welding, gluing or stitching may be employed for this purpose. This can be done, for example, as discussed in U.S. Pat. No. 9,315,940, which is incorporated herein by reference as if fully set forth.

During assembly of the seamed press felt base fabric, at least one layer of the second fabric structure is located in an interior open central area of the flattened continuous tube of the first fabric structure, and optionally on one or both one exterior surfaces of the flattened double layer arrangement.

A sufficient length and width of the second fabric structure is provided so as to fill the entire length and width of the interior open central area of the flattened double layer arrangement or, optionally, fully cover an exterior surface. Once the first and second ends of the structure are precisely located in the manner described in detail below, the second fabric structure is then loosely stitched to the double layer arrangement of first fabric structure adjacent to, and interior to, the fold region to retain the generally planar yarn assembly structure in position for subsequent assembly. The spirally wound double layer first fabric structure, and the second fabric structure, are then bonded together in a needling process to form a base fabric for a press felt by needling one or more layers of a nonwoven fibrous batt material into and through the assembly.

The needled base fabric assembly is then subjected to heat-setting and various other known finishing steps so as to stabilize it. Unbroken lengths of the first yarns at each of the fold regions located at the opposite ends of the flattened tube of the double layer structure are then freed from the batt fibers to provide yarn loops which will be used to provide a seam for the seamed press felt. The fold areas include unbroken loops of first yarns which are used to form the final seam. Following these steps, the finished nonwoven press felt is ready for installation in the press section of a paper machine. The fabric may be installed by passing it through the press section at slow speed while attached to one end of the previous press felt, bringing together the opposed seam regions, intermeshing the loops formed by the first yarns of the first array at the fold regions, and then inserting a pintle or similar joining wire or device through the channel provided at the seam regions by the loops at the fold regions to close the fabric.

The base fabric used in the first embodiment of the press felt of the present invention is preferably assembled using a spiral winding process generally as described in U.S. Pat. No. 5,268,076 to Best et al. and U.S. Pat. No. 5,360,656 to Svensson et al., both of which are incorporated herein by reference as if fully set forth. FIG. 1 provides a schematic illustration of this process. As shown in FIG. 1, a length of textile material 10 is paid off a spool 20 or from a similar source and is spirally (or helically) wound about two opposing rollers 22, 24 so that the longitudinal edges of each successive turn either abut or overlap one another. During assembly, each adjacent turn is bonded to the next by a chosen bonding process, such as stitching, welding, gluing or other suitable means. The prior art textile material 10 used for this purpose was usually a woven textile produced on a high speed narrow loom, either as the spirally wound fabric is made, or as stock material prior to the spiral winding process. Each adjacent turn of material is laid parallel to the next and usually oriented or canted at a small angle to the intended longitudinal or eventual MD of the finished fabric as it is spirally wound. Once the desired width and length of spirally wound fabric has been obtained, the textile material is cut from the feed source and the loosely cohesive spirally wound fabric is removed from the spiral winding assembly apparatus. Following removal, the fabric may be laid flat to provide a double layer structure 30 with two opposing fold regions 32, 34 that define the respective ends 36, 38 so that the resulting tube-like base fabric now resembles that shown in FIG. 2.

Figure 3:
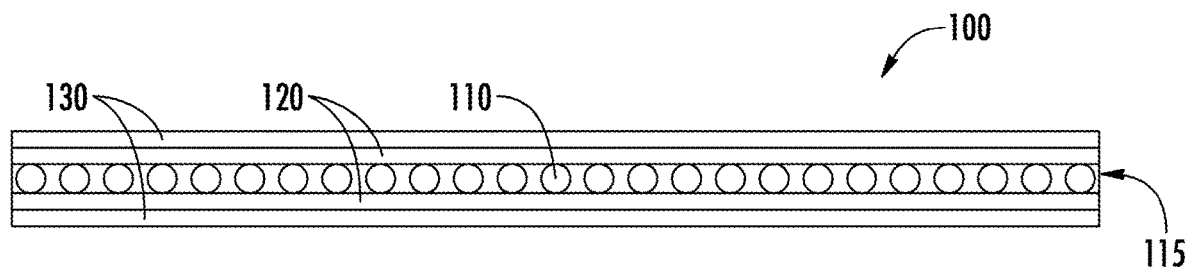
FIG. 3 is a diagrammatic illustration of a cross-section across the MD yarns of a first fabric structure which may be used in the assembly of base fabrics for nonwoven press felts according to the present invention.

FIG. 3 presents a cross-section taken across the yarns 110 in a first yarn array 115 of a first fabric structure 100 used in the assembly of the press felt base fabrics in an embodiment of the present invention. The first fabric structure 100 is spirally wound in the manner described in relation to FIG. 1 so that the yarn array 115 is oriented at a small angle, typically from about 1° to 5° to the longitudinal direction, or MD, of the base fabric. As shown in FIG. 3, the first fabric structure 100 is provided as a continuous strip of an array 115 of polymeric monofilament yarns 110 each of which is parallel to the next and regularly spaced apart at a desired spacing, which spacing may be adjusted according to need. The first and second fabric structures are essentially the same, except that the yarn types, size and density will differ; except where indicated, the following description applies equally to both.

Figure 4:
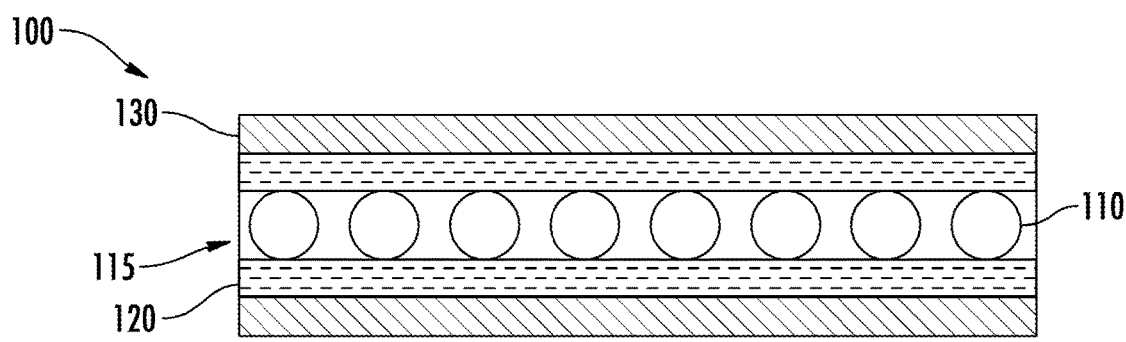
FIGS. 4 and 5 are illustrations showing the construction and composition of first and second generally planar yarn assemblies used in the nonwoven press felt base fabrics of the present invention.

FIG. 4 shows details of a particularly preferred construction of the first fabric structure 100 presented in FIG. 3. As shown, the yarns 110 of the first array 115 are "sandwiched" between two layers of a hot melt adhesive web material 120 to retain them in a desired position. SpunFab™ copolyamide thermoplastic adhesive, identified by part number FA1200-090-040 and available from Spunfab, Ltd. of Cuyahoga Falls, Ohio has been found to be suitable for this purpose; other adhesives, including thermoset adhesives, may also be satisfactory. The preferred thermoplastic adhesive is heat activated and has a first melting temperature; it provides a bond sufficient to bind the yarns 110 of the first array 115 in their desired positions to a non-woven backing 130.

The first array 115 and adhesive web 120 are sandwiched between two layers of the non-woven backing 130, which is significantly more robust than the adhesive web 120. The non-woven backing 130 provides cohesive strength to the array 115 to which the yarns 110 are bonded by the adhesive web 120, and this strength is sufficient to enable subsequent processing of the array during assembly.

Figure 6:
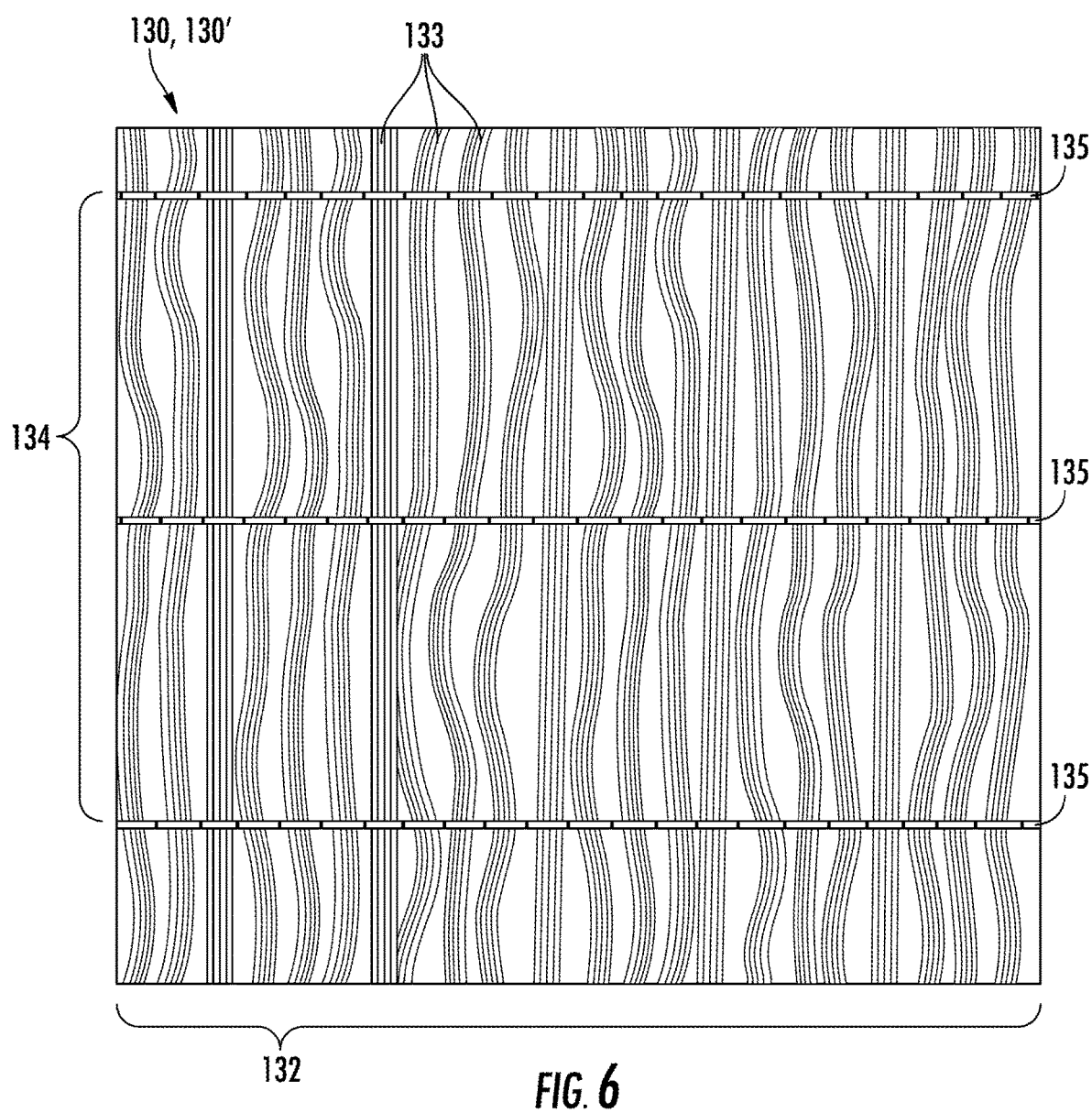
FIG. 6 is an enlarged view of a non-woven backing used to assemble the first and second generally planar yarn assemblies shown in FIGS. 4 and 5.
Figure 7:
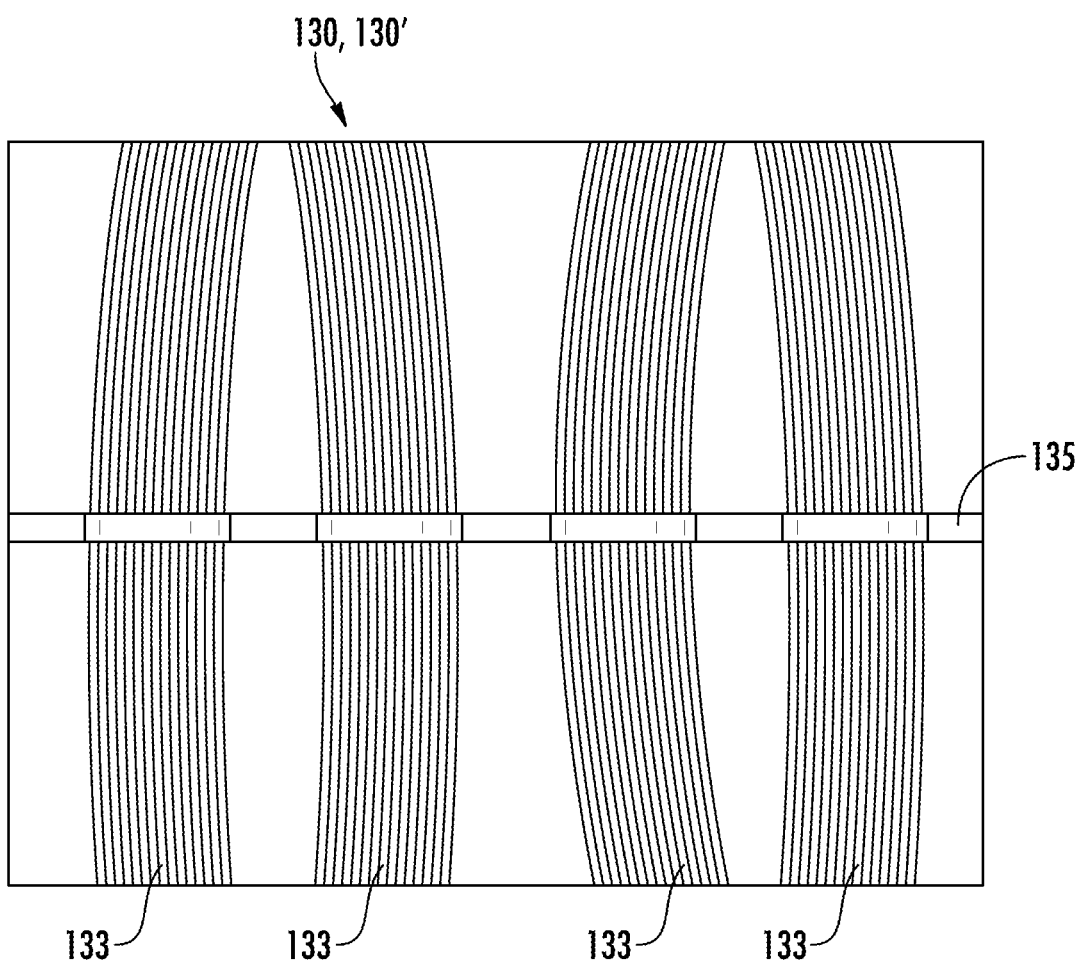
FIG. 7 is a greatly enlarged view showing the attachment of yarns from the first yarn system to yarns of the second yarn system using a heat activated material in one of the first and second yarn systems.

FIGS. 6 and 7 show detailed views of the non-woven backing 130. The non-woven backing 130 includes a layer of a first yarn system 132 and a layer of a second yarn system 134 oriented transverse to the first yarn system 132. At least one of the first and second yarn systems 132, 134 includes a low melt temperature adhesive that is heat activated and binds the first and second yarn systems 132, 134 together. The low melt temperature adhesive can be Copolyamide Nylon. Other suitable materials having a melt temperature in the range of 80-110 C can also be used. The first yarn system 132 preferably includes multi-filament yarns 133 twisted into a round diameter of 0.1 to 0.5 mm. Other sizes or types of yarns can be used depending on the particular application. Preferably the multifilament yarns 133 are made of a polymer selected from a polyamide or polyurethane, and can include the low melt temperature adhesive. The second yarn system 134 preferably includes multi-filaments 135 having a diameter of 0.2 mm or less. Other sizes or types of yarns can be used depending on the particular application. Preferably these monofilaments 135 are made of a polymer selected from a polyamide or polyurethane. The multifilament yarns 133 of the first yarn system 132 are oriented in the CD and have a tensile strength of at least about 50 lbs cloth/inch. Preferably, the multifilament yarns 133 have a fill density of 80% or greater. The monofilaments 135 of the second yarn system 134 preferably have a fill density of 20% or less and are primarily used for holding the multifilament yarns 133 in place.

An advantage of the present non-woven-backing 130 is that the first and second yarn systems 132, 134 can contribute to the overall properties of the final press felt produced.

In addition to the properties being a function of the first and second fabric structures 100, 200, for example, a void volume of the press felt can be adjusted by at least one of adjusting at least one of a fill density or a size of yarns 133 in the first yarn system 132, or adjusting at least one of a fill density or a size of yarns 135 in the second yarn system 134.

For example, the use of the multifilament yarns 133 provides the benefit that the small component fibers act similarly to a fine batt material and assist to enhance the dewatering effect of the press felts of the invention. The fine fibers are effective in wicking moisture from the batt into the interior of the felt where it is subsequently removed by vacuum after transporting water from the sheet. In addition to providing structural support to the first and second fabric structures, the fibrous scrim thus appears to enhance the dewatering capability of the press felts of the present invention.

The yarns 110 of the first array 115 are preferably multifilaments comprised of a polyamide polymer. Alternatively, cabled monofilaments could be used as some or all of the yarns 110 of the first array. Polyamide-6 (also known as nylon 6 or PA-6) is presently preferred for this purpose due to its "toughness", resistance to degradation due to environmental effects, and tensile strength, although other polyamide materials may prove suitable. The yarns 110 of the first array 115 will be oriented, following assembly of the first fabric structure 100 in the spiral winding process, at a small angle of from about 1° to about 5° to the intended MD of the completed press felt and will thus provide the yarn loops forming the seam region of the completed press felt. The number of MD yarns per unit width (yarn density) in the first fabric structure 100 is preferably different from that in the generally planar yarn assembly second, and will be in the range of from 15-40 yarns/inch (5.9 to 15.7 yarns/cm); as shown in FIG. 4, the yarn density in the first preferred embodiment of the array 115 of the first fabric structure 100 is 18 yarns/in. (7.1/cm). The yarn density of the first fabric structure 100 is preferably selected to present an "open" structure to the PS surface of the press felt to maximize water removal, permeability and void volume in the completed press felt. Further, as these yarns 110 will provide the eventual seam loops in the seam region of the completed press felt, they must be spaced apart sufficiently to allow the two sets of loops from the opposing ends of the fabric to be capable of being intermeshed without any undue distortion. The yarns 110 of the first fabric structure 100 also provide the necessary seam tensile strength to the assembled press felt and must therefore be sufficiently robust so as to withstand the various mechanical and environmental forces to which they may be exposed during use. Thus, the yarn type, size and spacing are all important features of the first fabric structure and must be chosen with these considerations in mind.

For this reason, the yarns 110 of the first fabric structure 100 are arranged as a first planar yarn array, and are preferably of a different size to those in the generally planar yarn assembly that forms the second fabric structure 200 and are preferably larger; monofilaments having a preferably circular cross-sectional shape and a diameter of from about 0.3-0.6 mm are suitable; circular cross-section monofilaments having a diameter of 0.5 mm are presently particularly preferred for this purpose.

Figure 8:
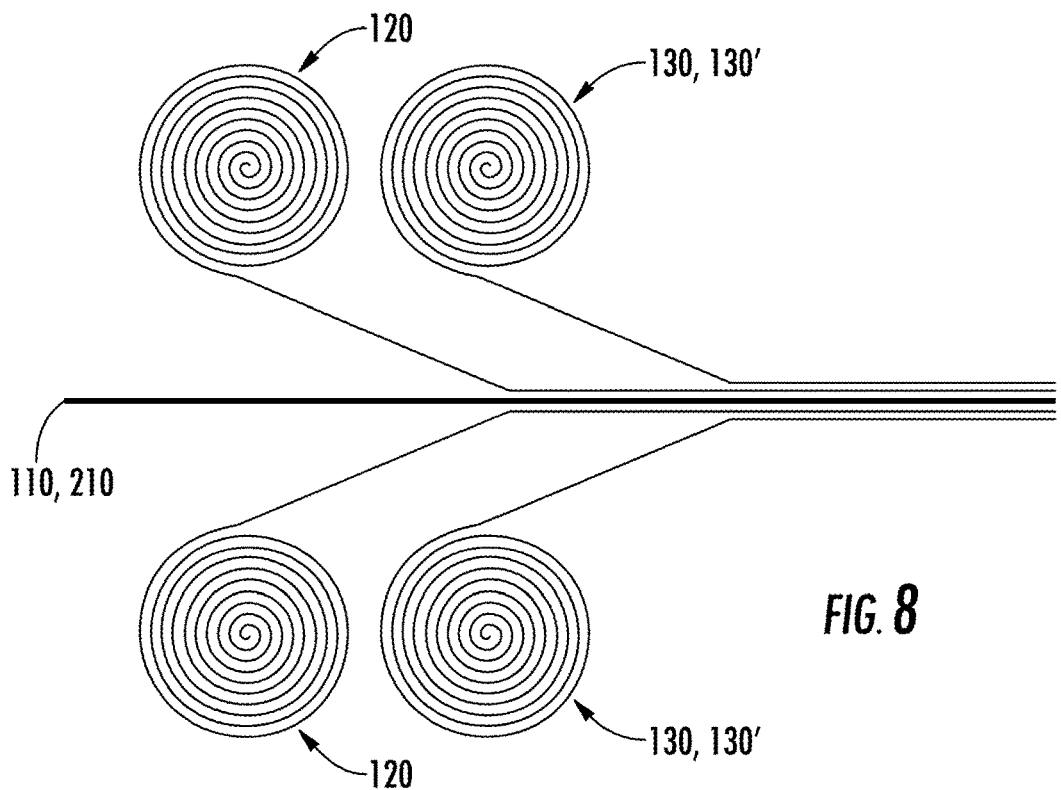
FIG. 8 is a schematic view showing the production of the first and second generally planar yarn assemblies.
Figure 9:
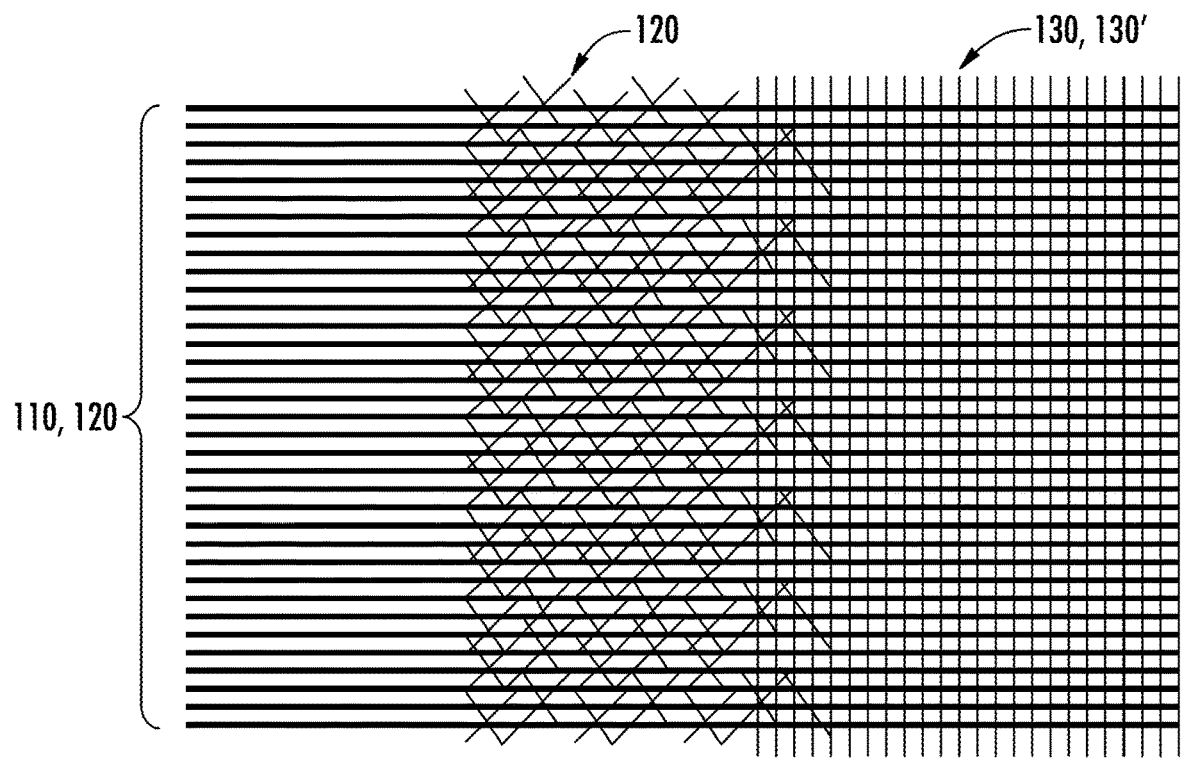
FIG. 9 is a top view taken along line 9-9 in FIG. 8.
Figure 14:
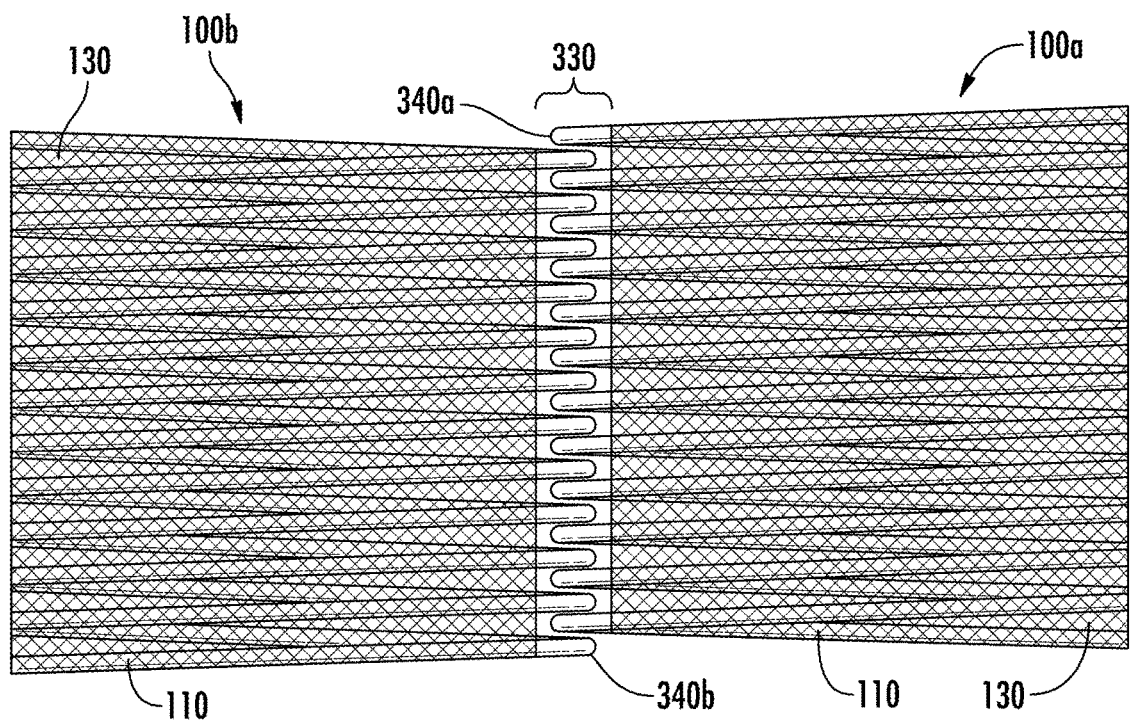
FIG. 14 is a planar view of the yarns and remaining second scrim at the seam region in the first fabric structure shown in FIGS. 12A-C and 13.

The adhesive web 120, the yarns 110 of the first array 115 and the non-woven backing 130 are assembled in the manner shown in FIGS. 8 and 9, and then heated under pressure in a continuous hot lamination process to a temperature sufficient to melt the adhesive web 120 so as to bond the yarns 110 in the first array 115 together to the non-woven backing 130 and thus retain them at the desired orientation and yarn density. In a preferred assembly, this heating temperature is in the range of from about 220° F. to about 280° F. (104° C.-138° C.). Selection of appropriate heating temperature sufficient to melt the adhesive web 120 will be dependent on the speed by which the fabric structure is moved through the lamination process. During and following the lamination process, a portion of the adhesive web 120 melts and effectively dissipates into the fabric structure, leaving behind the first array 115 and non-woven backing 130 as the first fabric structure 100. This assembled and laminated first fabric structure 100 will preferably have an air permeability that is in the range of from about 200 to about 400 CFM (3120 to 6240 m3/m2/hr).

Figure 5:
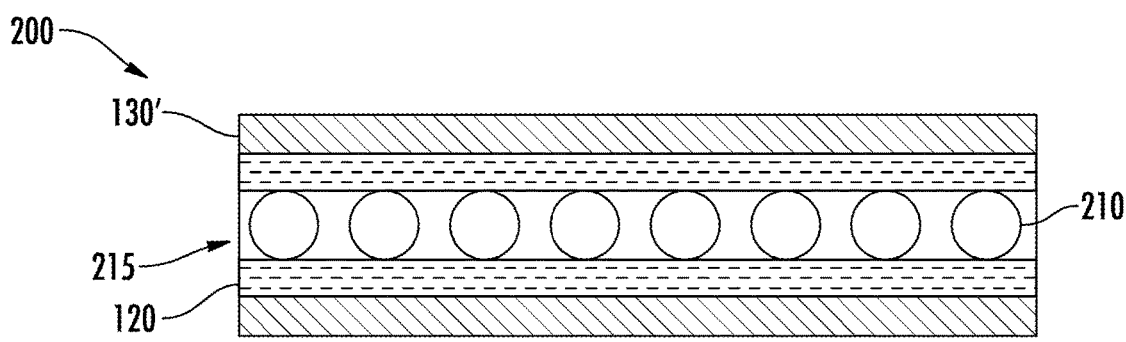

FIG. 5 shows details of a particularly preferred construction of the second fabric structure in the form of a generally planar yarn assembly 200, which is similar to that presented in FIG. 4, except that the yarns 210 in the array 215 are preferably smaller in diameter or size and arranged at higher density than those in the first array 115 of fabric structure 100. As shown, the yarns 210 of the second array 215 are "sandwiched" between two layers of a hot melt adhesive web 120 to retain them in a desired position. As in FIG. 6, SpunFab™ copolyamide thermoplastic adhesive, part number FA1200-090-040 available from Spunfab, Ltd. of Cuyahoga Falls, Ohio and which is heat activated is particularly preferred, although other adhesives may prove satisfactory. The second array 215 and adhesive web 120 are sandwiched between two layers of a second non-woven backing 130', which can be the same as the non-woven backing 130, or can have different properties. This provides cohesive strength to the array and adhesive.

The yarns 210 of the second array 215 used in the yarn assembly 200 are preferably also monofilaments, but could also be cabled or other multicomponent yarns, or combinations of monofilaments, cabled and/or multifilament yarns, and are preferably comprised of a polyamide polymer; for this application, yarns comprised of polyamide-6/10 (or PA-6/10, or nylon 6/10) are presently preferred due to their dimensional stability when exposed to varying moisture levels, although other types of polyamide yarns may prove suitable. The yarns 210 of the second array 215 will be oriented, following assembly of the yarn assembly 200 with the first yarn assembly 100 as described in detail below, with the intended CD of the completed press felt. The yarn density of the second array 215 will preferably be higher than that in the first array 115 and will preferably be in the range of from about 21 to 30 yarns/in. (8.3 to 11.8 yarns/cm) when selected in conjunction with the yarn density of the first array 115 so that the chosen value meets this criterion. As shown in the construction presented in FIG. 5, in a particularly preferred arrangement of the second array 215 for use with the preferred arrangement of the first array 115, the yarn density is 24 yarns/in (9.45 yarns/cm). Alternatively, the yarns 210 of the second array 215 may be provided at a density equal to, but not less than, the yarn density of the first array 115, i.e. 15 to 40 yarns/inch (5.9 to 15.7 yarns/cm). Also as shown, the size or diameter of the yarns 210 in the second array 215 is smaller than that of the yarns 110 in the first array 115; monofilaments having a circular cross-sectional shape and a diameter of about 0.4 mm are presently preferred for this purpose when used in combination with larger yarns 110 in the first fabric structure 100. It would also be possible to use cabled monofilaments as the yarns 210 of the second array 215. If this is done, then the component monofilaments should have a diameter, d, in the range of 0.1 to 0.3 mm, and may be cabled in one of a d×2×2, d×2×3 or d×3×3 arrangements. The effective diameter of these cabled yarns (i.e.: the outside diameter of the cabled assembly) is preferably selected so as to be less than or equal to the diameter of the single monofilament yarns 110 in the first array 115. The yarns 210 of the yarn assembly 200, when assembled with the first fabric structure 100 in the completed press felt, provide a CD oriented support surface to the fabric and paper conveyed; they thus should be provided as comparatively smaller yarns (in relation to those in the first fabric structure 100) and arranged at a higher density than those in the first structure 100. Although monofilaments can be used satisfactorily, cabled or other multicomponent yarns will provide improved batt anchorage, which may be necessary in certain applications. Also, certain applications may dictate that the yarn density and size in the second array 215 be equal to that in the first array 115. The second fabric structure is assembled in the same manner as the first fabric structure described above and as shown schematically in FIGS. 8 and 9.

FIG. 10A is a planar view of the first fabric structure 100 shown schematically in FIGS. 3 and 4. In FIG. 10A, the first yarn array 115 is comprised of a plurality of single monofilaments 110 having a desired size and a selected regular spacing which are bonded together between two layers of the non-woven backing 130 using two layers of a hot melt adhesive web (not shown) to retain them in a desired position on the scrim. The first array 115, adhesive web and the non-woven backing 130 are bonded together in a hot lamination process employing heat and pressure as previously described to form the first fabric structure 100 which, following preparation, is sufficiently robust and cohesive so as to allow subsequent handling and assembly. As previously mentioned, the non-woven backing 130 can also provide a type of precursor batt material which offers additional benefits to the assembled press felt with respect to improved dewatering and batt anchorage. FIGS. 10B and 10C show a CD cross-section and a side view taken along one of the MD monofilaments 110, respectively.

Figure 2:
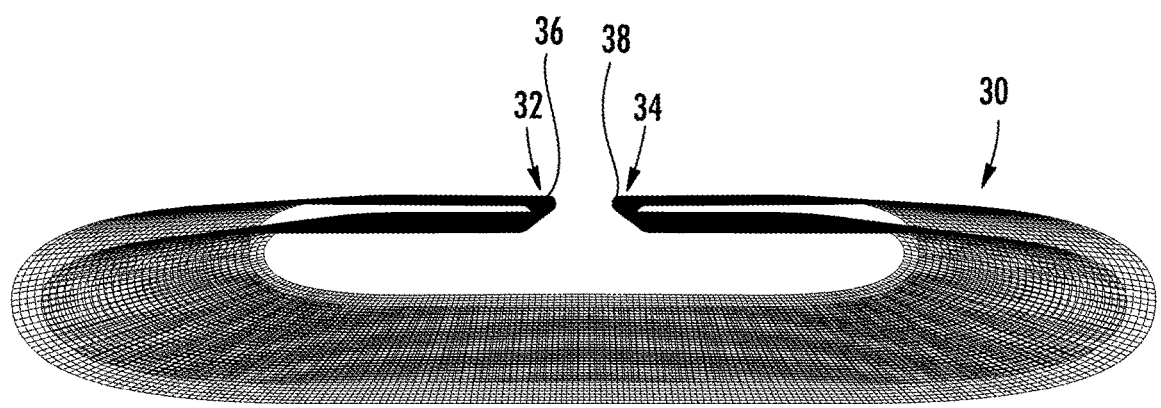
FIG. 2 is a view of a continuous tube-like base fabric 30 including opposing fold regions 32 and 34; fabric 30 may be made from successive turns of the narrow fabric 10 in the manner illustrated in FIG. 1, or it may be produced by a modified endless weaving process, a flat weaving process where opposing ends of the flat woven cloth are joined to provide a continuous tube, or it may be a nonwoven cohesive assembly of yarns oriented in the length direction around the tube.

A continuous length of the first fabric structure 100 is provided as described above and is then spirally wound and assembled in a known manner as shown in FIGS. 1, 2 and 11, to provide a continuous tube 300 that is open in the center area 310. As shown in FIG. 11, the yarns of the first fabric structure 100 are oriented left to right across the Figure in the longitudinal or lengthwise direction of the spirals and are canted at a small angle to the intended MD of the finished fabric. Yarn loops 340a, 340b (see FIG. 13) formed by the yarns 110 of the first fabric structure 100 at the opposing first and second fold regions 320a, 320b of the continuous tube 300 are then freed from the non-woven backing using a rotary brush 350 or similar device which may be mounted so as to translate across the fold regions 320a, 320b of the tube 300. Removal of the non-woven backing 130 between the yarns 110 in the fold regions 320a, 320b creates an open area 330 at the fold regions 320a, 320b in the spirally wound first fabric structure 100 as shown in planar view at FIG. 12A, and in FIGS. 12B and 12C which are similar to FIGS. 10B and 10C. When the tube 300 is collapsed as shown in FIG. 11, the freed yarns 110 in the area 330 form loops 340a, 340b at the opposing fold regions 320a, 320b as shown in FIG. 13 which will be used to provide a seam in the assembled seamed press felt. The yarn size and density in the first fabric structure 100 is selected so that these loops 340a, 340b can be intermeshed in the manner shown to form the seam region of the eventual fabric. The appearance of the intermeshed yarn loops 340a, 340b from the opposing fold regions 320a, 320b of the spirally wound and collapsed continuous tube 300 are shown in planar view in FIG. 14; the non-woven backing 130 has been cleared from the open area 330 at the fold regions where the yarn loops 340a, 340b are brought together and intermeshed.

Figure 15:
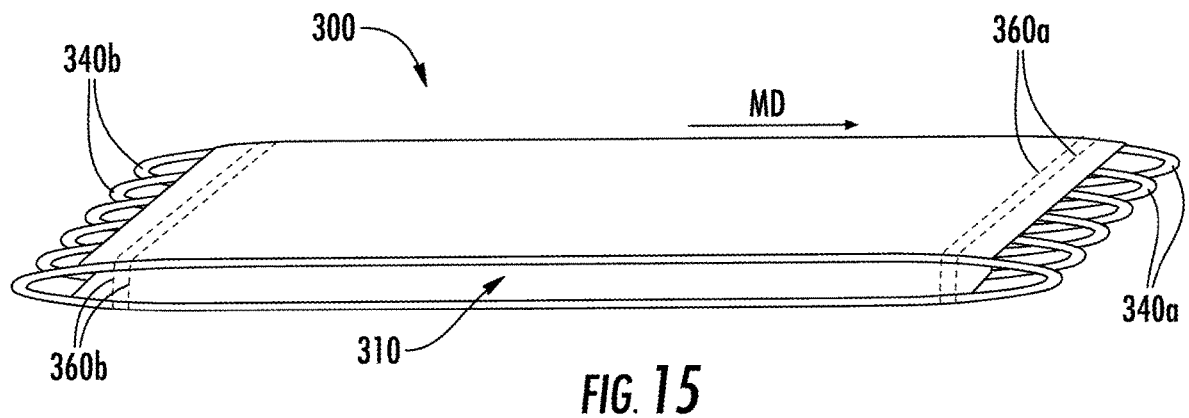
FIG. 15 is a schematic representation of a perspective view of the double layer structure of FIGS. 11 to 14 in which the spirally wound continuous tube base fabric formed of the first fabric structure has been opened in the center area to accept a generally planar yarn assembly; the dotted lines indicate where stitching may occur to join the first fabric structure and yarn assembly.
Figure 16:
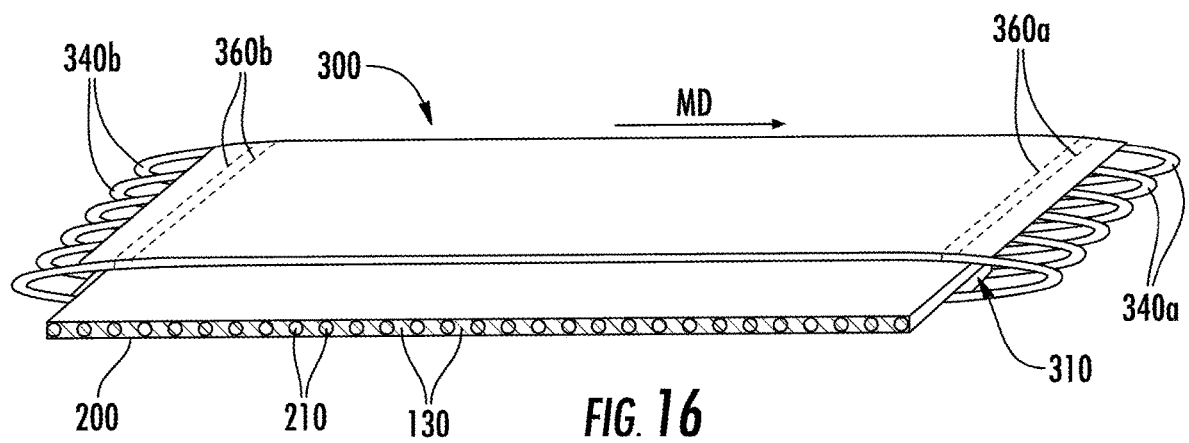
FIG. 16 is a perspective view of the first fabric structure of FIG. 15 in which a generally planar yarn assembly (second fabric structure) is partially inserted into the open, flattened central area of the tube now formed by the first fabric structure in a first embodiment of the invention.

FIG. 15 is similar to FIG. 11 but shows the freed MD yarn loops 340a, 340b exposed following the brushing process diagrammatically illustrated in FIG. 11. At this point, the flattened tube 300 is ready for the generally planar yarn assembly that forms the second fabric structure 200 to be inserted into the open area 310 inside the collapsed tube 300; this is illustrated in FIG. 16. Following insertion of second fabric structure 200 in the manner described in detail below, one or more rows of stitches as indicated by dotted lines 360a, 360b are provided to the collapsed tube 300 interior to and adjacent the yarn loops 340a, 340b in the seam region of the tube. This stitching will stabilize the newly formed loops 340a, 340b and prevent them from migrating or rolling out of plane during subsequent processing, and retain the second fabric structure 200 in its desired position inside open area 310 of collapsed tube 300. It is important that the loops 340a, 340b be stabilized at this point in the assembly process as it will be very difficult to align them at a later stage.

As shown in FIG. 16, the continuous tube 300 is collapsed and laid flat prior to insertion of the generally planar yarn assembly forming the second fabric structure 200, and the interior length of the flattened tube is measured. A sufficient length of the yarn assembly 200 is prepared, with its length preferably being from 1% to 10% less than the interior length of the flattened tube. The generally planar yarn assembly 200 is inserted into the open central area 310 interior to the flattened continuous tube 300 prior to stitching the assembly as shown at 360a, 360b. Preferably, the generally planar yarn assembly 200 exhibits a degree of stretch in a direction transverse to the yarn orientation, and so may be extended as necessary to fill area 310 from end to end. Once inserted, one end of the continuous length of second fabric structure 200 is stitched in position at one end of the tube as shown by the dotted lines 360a, and then can be stretched to reach the opposite end of the tube interior 310a where it is again stitched in position as shown by dotted lines 360b. The second fabric structure 200 ideally fills the entire space 310 and is held in place by the rows of stitching 360a, 360b which also serve to stabilize loops 340a, 340b. The continuous tube 300, now filled with the second fabric structure 200, is then joined together using the yarn loops 340a, 340b at the opposing fold regions 320a, 320b in the manner shown schematically in FIG. 17.

Figure 17:
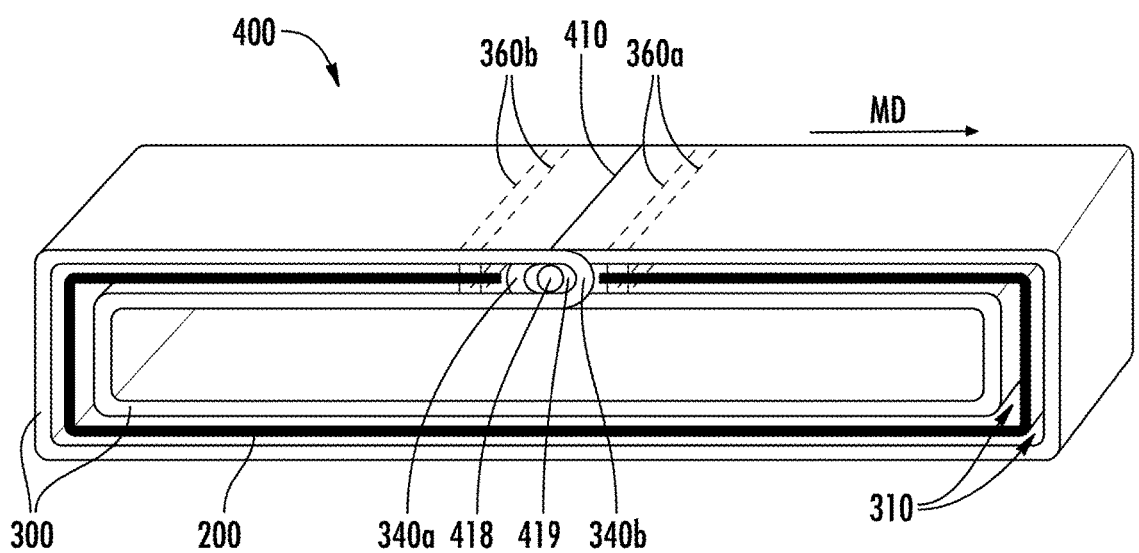
FIG. 17 is a perspective view of the assembled first fabric structure and generally planar yarn assembly as arranged according to a first embodiment of the press felt base fabric of the invention following insertion of the yarn assembly as shown in FIG. 16.

FIG. 17 is a schematic representation of a seamed press felt 400 according to a first embodiment of the invention and is a perspective view taken across a lateral edge along the MD. As shown, press felt 400 includes two layers of the spirally wound continuous tube 300 formed from successive turns of a first fabric structure 100 arranged in the manner described in relation to FIGS. 11 through 15 and joined one to the next along their lengthwise edges. Yarn loops 340a, 340b formed from the yarns 110 of first fabric structure 100 and are oriented in the length or MD direction of the press felt 400 when in use. The yarn loops 340a, 340b are held orthogonal to the plane of the press felt 400 and, when brought together and intermeshed provide open channel 419 through which pintle 418 may be inserted to close the opposing ends of press felt 400 when installed on the machine for which it is intended.

The second fabric structure 200, which is preferably assembled from a number of panels that have been joined edgewise one to the next in the manner described in U.S. Pat. No. 9,315,940, is located into tube 300 as a continuous generally planar yarn assembly 200 as described in relation to FIG. 16 above. The rows of dashed lines 360a, 360b indicate the location where the first and second fabric structures 100, 200 are stitched together prior to needling and further processing so as to retain them in alignment, and stabilize loops 340a, 340b. As assembled in press felt 400, the yarns 210 of second fabric structure 200 are oriented in the CD perpendicularly to the yarns 110 in the plane of first fabric structure 100 of continuous tube 300. The component yarns 210 are preferably equal to, or smaller in diameter than the component yarns 110 and may be provided at the same or a higher density, and as either single or cabled monofilaments. One or more layers of a fibrous batt material is needled into the assembly of the second fabric structure and continuous tube; the batt is cut at seam region 410 to provide access to the yarn loops 340a, 340b so that they may be intermeshed during installation of press felt 400. A pintle such as 418 is located in the channel 419 formed by intermeshed loops 340a, 340b so as to join the press felt 400.

As can be seen in FIG. 17, press felt 400 is a three-layer construction, consisting of two layers of the continuous tube 300 consisting of first fabric structure 100 arranged between which (such as at 310) is located one layer of second fabric structure 200. The press felt 400 further includes a seam formed by yarn loops 340a, 340b through which a pintle such as 418 may be passed allowing the seamed press felt 400 to be joined on the machine or which it is intended. The seamed press felt 400 is thus a wholly nonwoven, multiaxial construction including a seam.

One or more layers of a fibrous batt material (not shown) are needled into the three-layer assembly using known techniques common to the manufacture of press felts. The fibrous batt material is typically a selected mixture of polyamide fibers such as is known in the art; it is possible that a portion of these fibers may be bi-component in nature and include an adhesive component which, during subsequent fabric processing, melts to provide improved surface fiber retention and smoothness to the resulting fabric.

Referring now to FIGS. 18-20 an alternate embodiment for a seamless press felt 500 is schematically shown. As shown in FIG. 18, the seamless press felt 500 is formed with a continuous length of the first fabric structure 100 as described above that is spirally wound and assembled in a known manner as shown in FIGS. 1 and 11, to provide a continuous tube. The construction of the first fabric structure 100 can be as shown in FIG. 3 and discussed above. The yarns 110 of the first array 115 can be connected to a single layer of a hot melt adhesive web material 120 to retain them in a desired position. SpunFab™ copolyamide thermoplastic adhesive can be used, or other adhesives, including thermoset adhesives, may also be satisfactory. The preferred thermoplastic adhesive is heat activated to a first melting temperature sufficient to bind the yarns 110 of the first array 115 in their desired positions to a non-woven backing 130. The first array 115 and adhesive web 120 are connected to a layer of the non-woven backing 130 in a similar manner as discussed above. The non-woven backing 130 provides cohesive strength to the array 115 to which the yarns 110 are bonded by the adhesive web 120, and this strength is sufficient to enable subsequent processing of the array during assembly. While a single layer of the adhesive web 120 and a single layer of the non-woven backing 130 can be used, it is also possible to use the sandwiched construction of the first fabric structure 100. The first fabric structure 100 has an MD length and CD width and is arranged formed as a first endless fabric loop 510.

Still with reference to FIG. 18, a generally planar yarn assembly formed using the second fabric structure 200 as discussed above is provided and includes an array 215 of CD oriented parallel yarns 210 that are formed into a second endless fabric loop 520 that is generally the same size as the endless loop 510 of the first fabric structure. The second fabric structure 200 is preferably assembled from a number of panels 522 as shown in FIG. 19 that have been joined edgewise one to the next in the manner described in U.S. Pat. No. 9,315,940. These panels 522, for example have a width in the MD of 1 meter, and these panels 522 are joined edge to edge through an overlapped weld zone, where the panels 522 can be laser welded, heat fused, or glued together to achieve the desired MD length. The MD edges of the first and last panels 522 are then joined in the same manner to form the second endless fabric loop 520 that is generally the same size as the first endless fabric loop 510 of the first fabric structure for the seamless press felt 500. The second endless fabric loop 520 is inserted into the first endless fabric loop 510 forming two superimposed layers of the first and second fabric structures.

Still with reference to FIG. 18, preferably a third fabric structure formed as a third endless fabric loop 530, that is constructed in the same manner as the first endless fabric loop 510, is inserted into the second endless fabric loop 520. The third fabric structure is preferably the same as the first fabric structure 100 described above and is not shown in further detail. As shown in FIG. 20, the first, second, and the third endless fabric loops 510, 520, 530 are then connected together through needling at least one layer of fibrous batt material 540 into and through these fabric structures 510, 520, 530 to form the seamless press felt 500. The fibrous batt material 540 is typically a selected mixture of polyamide fibers such as is known in the art; it is possible that a portion of these fibers may be bi-component in nature and include an adhesive component which, during subsequent fabric processing, melts to provide improved surface fiber retention and smoothness to the resulting fabric.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

The invention claimed is:

1. A seamed press felt comprising:
a non-woven base fabric material formed of a first fabric structure, the first fabric structure including an array of MD yarns connected to at least one layer of a hot melt adhesive web material and at least one layer of a non-woven backing, the non-woven backing including a layer of a first yarn system and a layer of a second yarn system oriented transverse to the first yarn system, at least one of the first and second yarn systems including a low melt temperature adhesive that is heat activated and binds the first and second yarn systems together, the non-woven base fabric material having an MD length and CD width and is arranged in two superimposed layers joined by the MD oriented yarns at CD oriented fold regions at each of two opposing ends thereof, the MD oriented yarns forming uniform loops at the fold regions to define a channel extending the CD width of the press felt, a generally planar yarn assembly formed of a second fabric structure, the second fabric structure including an array of parallel yarns, the generally planar yarn assembly being located interior to the two superimposed layers of base fabric and is oriented such that the parallel yarns of the array are oriented in the CD of the press felt, and a pintle extending through the channel defined by intermeshing the loops from the two opposing ends to form a seam.

2. The press felt according to claim 1, wherein in the second fabric structure, the array of parallel yarns are bonded to at least one second layer of a hot melt adhesive web material and at least one second layer of a second non-woven backing, the second non-woven backing including a layer of a first yarn system and a layer of a second yarn system oriented transverse to the first yarn system, at least one of the second non-woven backing first and second yarn systems including a low melt temperature adhesive that is heat activated and binds the second non-woven backing first and second yarn systems together.

3. The press felt according to claim 2, wherein the first yarn system includes multi-filament yarns twisted into a round diameter of 0.1 to 0.5 mm, and the second yarn system includes monofilaments having a diameter of 0.2 mm or less.

4. The press felt according to claim 3, wherein the multifilament yarns are comprised of a polymer selected from a polyamide or a polyurethane.

5. The press felt according to claim 3, wherein yarns of the first yarn system are oriented in the CD and have a tensile strength of at least about 50 lbs cloth/inch.

6. The press felt according to claim 3, wherein the multifilament yarns of the first yarn system have a fill density of 80% or greater.

7. The press felt according to claim 3, wherein the monofilaments of the second yarn system have a fill density of 20% or less.

8. The press felt according to claim 1, wherein a void volume of the press felt is adjustable by at least one of: adjusting at least one of a fill density or a size of the parallel yarns in the array of yarns of the generally planar yarn assembly, adjusting at least one of a fill density or a size of yarns in the first yarn system, or adjusting at least one of a fill density or a size of yarns in the second yarn system.

9. The press felt according to claim 1, wherein the base fabric material comprises a plurality of spirally wound turns of the first fabric structure and each adjacent one of the wound turns of the first fabric structure is oriented at an angle to the MD and is bonded to an adjacent turn to provide a flattened continuous double layer tube.

10. The press felt according to claim 1, wherein the MD yarns are single circular cross-sectional shaped monofilaments having a diameter of 0.2 mm to 0.6 mm arranged at a yarn density of from 15 to 40 yarns/inch (5.9 to 15.7 yarns/cm).

11. The press felt according to claim 1, wherein the CD yarns of the second fabric structure are single circular cross-sectional shaped monofilaments having a diameter of 0.2 to 0.6 mm arranged at a yarn density of from 10 to 20 yarns/inch.

12. A seamless papermaking fabric, comprising a first fabric structure including an array of MD yarns, at least one layer of a hot melt adhesive web material and at least one layer of non-woven backing, the non-woven backing includes a layer of a first yarn system and a layer of a second yarn system oriented transverse to the first yarn system, at least one of the first and second yarn systems includes a low melt temperature adhesive that is heat activated and binds the first and second yarn systems together, the first fabric structure has an MD length and CD width and is arranged formed as a first endless fabric loop;

a generally planar yarn assembly formed of a second fabric structure that includes an array of CD oriented parallel yarns and is formed into a second endless fabric loop that is generally a same size as the first endless fabric loop, the second endless fabric loop is inserted into the first endless fabric loop forming two superimposed layers of the first and second fabric structures; and at least one layer of fibrous batt material needled into and through the superimposed layers of the first and second fabric structures.

13. The seamless papermaking fabric of claim 12, further comprising:

a third fabric structure formed as a third endless fabric loop, including an array of third MD yarns, at least one layer of the hot melt adhesive web material and at least one layer of the non-woven backing, the third endless fabric loop being inserted into the second endless fabric loop, and the at least one fibrous batt layer is needled into and through superimposed layers of the first, second, and third fabric structures.

14. The seamless papermaking fabric of claim 12, wherein in the second fabric structure, the array of CD oriented parallel yarns are bonded to at least one second layer of a hot melt adhesive web material and at least one second layer of a second non-woven backing, the second non-woven backing including a layer of a first yarn system and a layer of a second yarn system oriented transverse to the first yarn system, at least one of the second non-woven backing first and second yarn systems including a low melt temperature adhesive that is heat activated and binds the second non-woven backing first and second yarn systems together.

15. The seamless papermaking fabric of claim 14, wherein the second fabric structure is assembled from a number of panels formed of CD oriented parallel yarns, the panels are joined edgewise one to another, said panels each having a defined MD width and a number of the panels are joined together to achieve a desired MD length, and MD edges of a first and a last of the panels are joined to form the second endless fabric loop.

* * * * *